(12) United States Patent
Aronsson et al.

(10) Patent No.: US 7,866,228 B2
(45) Date of Patent: Jan. 11, 2011

(54) DEVICE FOR MOVING AT LEAST ONE MOVEABLE ELEMENT IN A GAS TURBINE

(75) Inventors: Egon Aronsson, Brålanda (SE); Mike Billett, Trollhättan (SE)

(73) Assignee: Volvo Aero Corporation, Trollhattan (SE)

( * ) Notice: Subject to any disclaimer, the term of this patent is extended or adjusted under 35 U.S.C. 154(b) by 1222 days.

(21) Appl. No.: 11/422,855

(22) Filed: Jun. 7, 2006

(65) Prior Publication Data

US 2007/0080262 A1 Apr. 12, 2007

Related U.S. Application Data

(60) Provisional application No. 60/595,174, filed on Jun. 13, 2005.

(51) Int. Cl.
*G05G 1/00* (2006.01)
(52) U.S. Cl. .................. 74/469; 74/99 R; 60/226.3; 60/232
(58) Field of Classification Search ............ 74/469, 74/99 R; 60/226.3, 232
See application file for complete search history.

(56) References Cited

U.S. PATENT DOCUMENTS

| 4,030,378 | A | * | 6/1977 | Kroesser | 74/469 |
| 5,142,930 | A | * | 9/1992 | Allen et al. | 74/469 |
| 5,145,313 | A | * | 9/1992 | Weyer | 414/723 |
| 7,004,047 | B2 | * | 2/2006 | Rey et al. | 74/469 |
| 2007/0068303 | A1 | * | 3/2007 | Bouru | 74/469 |
| 2009/0277295 | A1 | * | 11/2009 | Bryan et al. | 74/469 |

* cited by examiner

*Primary Examiner*—David M Fenstermacher
(74) *Attorney, Agent, or Firm*—Novak Druce + Quigg, LLP

(57) ABSTRACT

The invention relates to a device (20) for moving at least one moveable element (19) in a gas turbine engine (1) between a first and a second position. The device includes a linkage (21) that connects a pivotable annular member (18) with the moveable element (19) in such a way that the movement of the moveable element (19) between the two positions is accomplished when the annular member (18) is pivoted. The linkage (21) has a link member (22) connected to the moveable element (19) via a first articulation joint (23). The device also has a support member (24) that supports the link member (22) at a distance from the first articulation joint.

22 Claims, 8 Drawing Sheets

DEVICE FOR MOVING AT LEAST ONE MOVEABLE ELEMENT IN A GAS TURBINE

FIELD OF THE INVENTION

The present invention relates to a device for moving at least one moveable element in a gas turbine between a first and a second position, the device comprises a linkage adapted for connecting a pivotable annular member with said moveable element in such a way that the movement of the moveable element between the two positions is accomplished when said annular member is pivoted, wherein the linkage comprises a link member connected to the moveable element via a first articulation joint.

BACKGROUND OF THE INVENTION

The present disclosure is primarily directed toward applications in an aircraft jet engine. The device may be arranged for controlling air bleed. In known aircraft jet engines, a bleed passage extends between the primary gas duct and the secondary gas duct in order to bleed air from the primary gas duct to the secondary gas duct. In certain operational conditions, compressed air is bled from the primary gas duct via the bleed passage and introduced in a high speed gas flow in the secondary gas duct.

Such an air bleed device may be arranged in a fan hub frame of the engine. A plurality of openings run through the primary gas duct wall at mutual (equal) distances in the engine circumferential direction. The annular member surrounds the primary gas duct and a plurality of the moveable elements are arranged for both closing and opening the bleed openings. More specifically, the annular member is arranged on an opposite side of a casing wall relative to the moveable closing element. This should be regarded as a preferred, but not limiting application of the device.

In the context of the present disclosure, the term "jet engine" is meant to include various types of engines, which admit air at relatively low velocity, heat it by combustion and shoot it out at a much higher velocity. Accommodated within the term jet engine are, for example, turbojet engines and turbofan engines. The invention will be described below in an embodiment for a turbofan engine, but may of course also be used for other engine types.

According to a previously known air bleed system, the link member for transmitting the motion to the moveable closing element extends from the annular member through an opening in a casing wall to the moveable closing element. A large amount of the torque from the annular member was transmitted via the link member to an articulation joint during operation, which led to wear of the parts of the articulation joint.

SUMMARY OF THE INVENTION

A purpose of the invention is to achieve a device for moving at least one moveable element in a gas turbine, especially a bleed door, which has a longer life than other previously known devices of this type.

This purpose is achieved in that the device comprises a support member, which supports the link member at a distance from the first articulation joint. This solution creates conditions for reducing a lever distance from the annular member to the link member and the tensions in the link member are thereby reduced.

According to one embodiment of the invention, the link member is glidingly supported by a support surface of the support member. Providing such a support surface for a gliding interaction with the link member relieves the link member from part of the tension while the functionality of the device is maintained.

According to a preferred design, the support member comprises two opposed support surfaces for receiving and glidingly supporting the link member therebetween. The two opposite support surfaces of the support member makes sure that the link member is supported for movements of the annular ring in different directions.

According to a further embodiment of the invention, the link member extends between the first articulation joint and a second articulation joint adapted to be connected to the annular member and that the support surface is positioned between the first articulation joint and the second articulation joint. A lever distance from the annular member to the link member is reduced and the tensions in the link member are thereby also reduced.

According to a further embodiment of the invention, the device comprises means for releasably securing the support member to a stationary casing. By manufacturing the support member and the casing in two separate pieces, the replacement of parts is facilitated. Further, conditions are created for reducing wear significantly in that good tolerance may be achieved between the glide surfaces of the link member and the support member.

A further purpose of the invention is to achieve an apparatus for moving at least one moveable element in a gas turbine, especially a bleed door, which has a longer life than previously known apparatuses of this type.

This purpose is achieved with an apparatus comprising a pivotably arranged annular member, a plurality of moveable elements spaced in a circumferential direction of the annular member and a device for moving each moveable element between a first and a second position by pivoting the annular member. The device further comprises a linkage connecting the pivotably arranged annular member with the moveable elements, wherein the linkage comprises a link member connected to the moveable element via a first articulation joint and the device comprises a support member, which supports the link member at a distance from the first articulation joint.

According to a preferred design, the support member comprises two opposed support surfaces for receiving and glidingly supporting the link member therebetween. The two opposite support surfaces of the support member makes sure that the link member is supported for movements of the annular ring in different directions. The annular member can neither expand nor retract when it tends to be more oval during operation. Such ovalization may occur when the annular member is stuck and actuators are activated in order to close the moveable elements.

Further advantageous embodiments and advantages of the invention will be apparent from the following description, drawings and claims.

BRIEF DESCRIPTION OF THE DRAWINGS

The invention will be explained below, with reference to the embodiments shown in the accompanying drawings, wherein.

DETAILED DESCRIPTION

Figure 1:
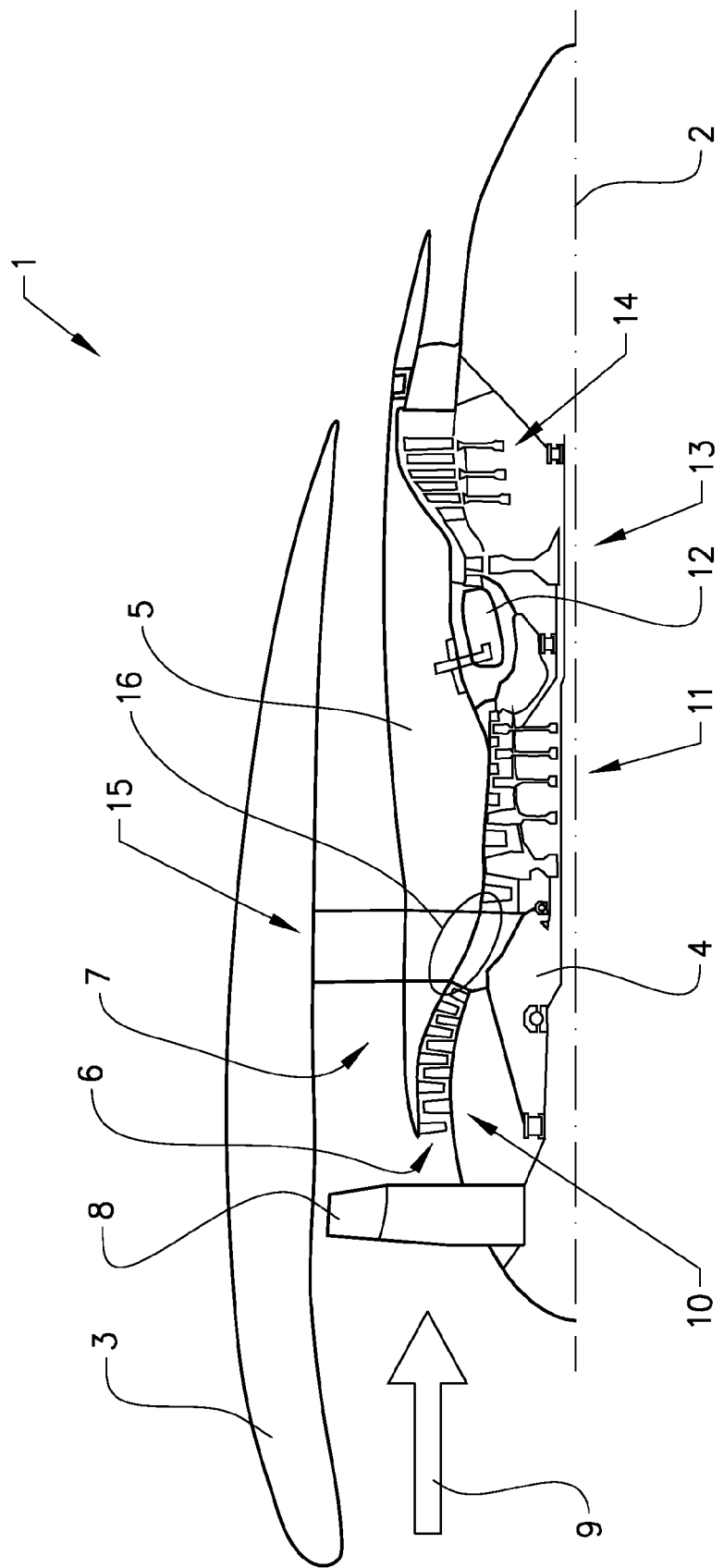
FIG. 1 is a schematic representation of an aircraft engine shown in a cutaway side view.

The invention is described below in the form of a turbofan gas turbine aircraft engine 1, which in FIG. 1 is circumscribed about an engine longitudinal central axis 2. The engine 1 comprises an outer casing 3, or nacelle, an inner casing 4, and an intermediate casing 5, which is concentric to the first two casings and divides the gap between them into an inner primary gas duct 6 for the compression of air and a secondary duct 7 in which the engine bypass air flows. Thus, each of the gas ducts 6,7 is annular in a cross section perpendicular to the engine longitudinal central axis 2.

The engine 1 comprises a fan 8 which receives ambient air 9, a booster or low pressure compressor (LPC) 10 and a high pressure compressor (HPC) 11 arranged in the primary gas duct 6, a combustor 12 which mixes fuel with the air pressurized by the high pressure compressor 11 for generating combustion gases which flow downstream through a high pressure turbine (HPT) 13 and a low pressure turbine (LPT) 14 from which the combustion gases are discharged from the engine.

A high pressure shaft joins the high pressure turbine 13 to the high pressure compressor 11 to form a high pressure rotor. A low pressure shaft joins the low pressure turbine 14 to the low pressure compressor 10 to form a low pressure rotor. The high pressure compressor 11, combustor 12 and high pressure turbine 13 are collectively referred to as a core engine. The low pressure shaft is at least in part rotatably disposed co-axially with and radially inwardly of the high pressure rotor.

A load carrying engine structure 15 is arranged between the outer casing 3 and the inner casing 4. The load carrying engine structure 15 is usually called fan hub frame.

The position of an apparatus for bleeding air from the primary gas duct 6 is indicated with reference numeral 16 in FIG. 1. Thus, the bleed apparatus is arranged between the low pressure compressor 10 and the high pressure compressor 11. A plurality of circumferentially spaced bleed passages 41, see FIG. 4, extend between the primary gas duct 6 and the secondary gas duct 7. The bleed passages define a flow path for routing air from the primary gas duct 6 to the secondary gas duct 7.

Figure 2:
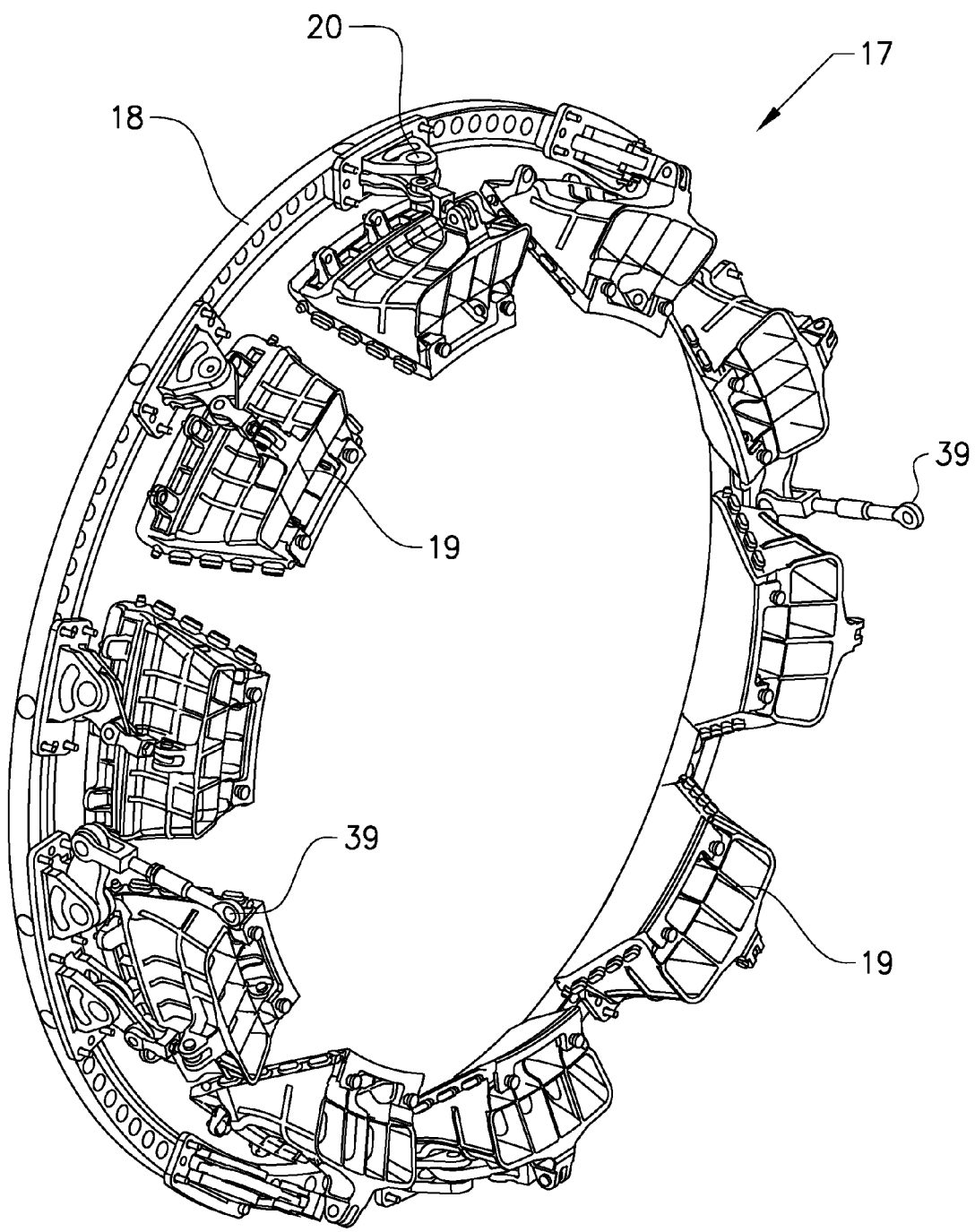
FIG. 2 is a perspective view showing an apparatus for bleeding air from the primary gas duct of the engine of FIG. 1.

FIG. 2 shows an apparatus 17 for bleeding air from the primary gas duct 6 from the position 16, see FIG. 1. The apparatus 17 comprises a pivotably arranged annular member 18, or ring, and a plurality of moveable elements 19 spaced in a circumferential direction of the aircraft engine 1. The annular member 18 is continuous in the circumferential direction and surrounds the primary gas duct 6. The moveable elements 19 are arranged for closing and opening, respectively each of the bleed passages 41, see FIG. 4. The moveable elements 19 form doors or shutters for in a closed state totally closing the passage. The moveable elements 19 are thus arranged in different inclined positions in the first and second position. More specifically, the moveable elements 19 are pivoted around an axis, in the form of a hinge, between the first and second position. The pivot axis extends perpendicularly relative to the engine longitudinal axis 2. The moveable elements 19 are configured for variably adopting any intermediate position between the first and second end positions.

Figure 3:
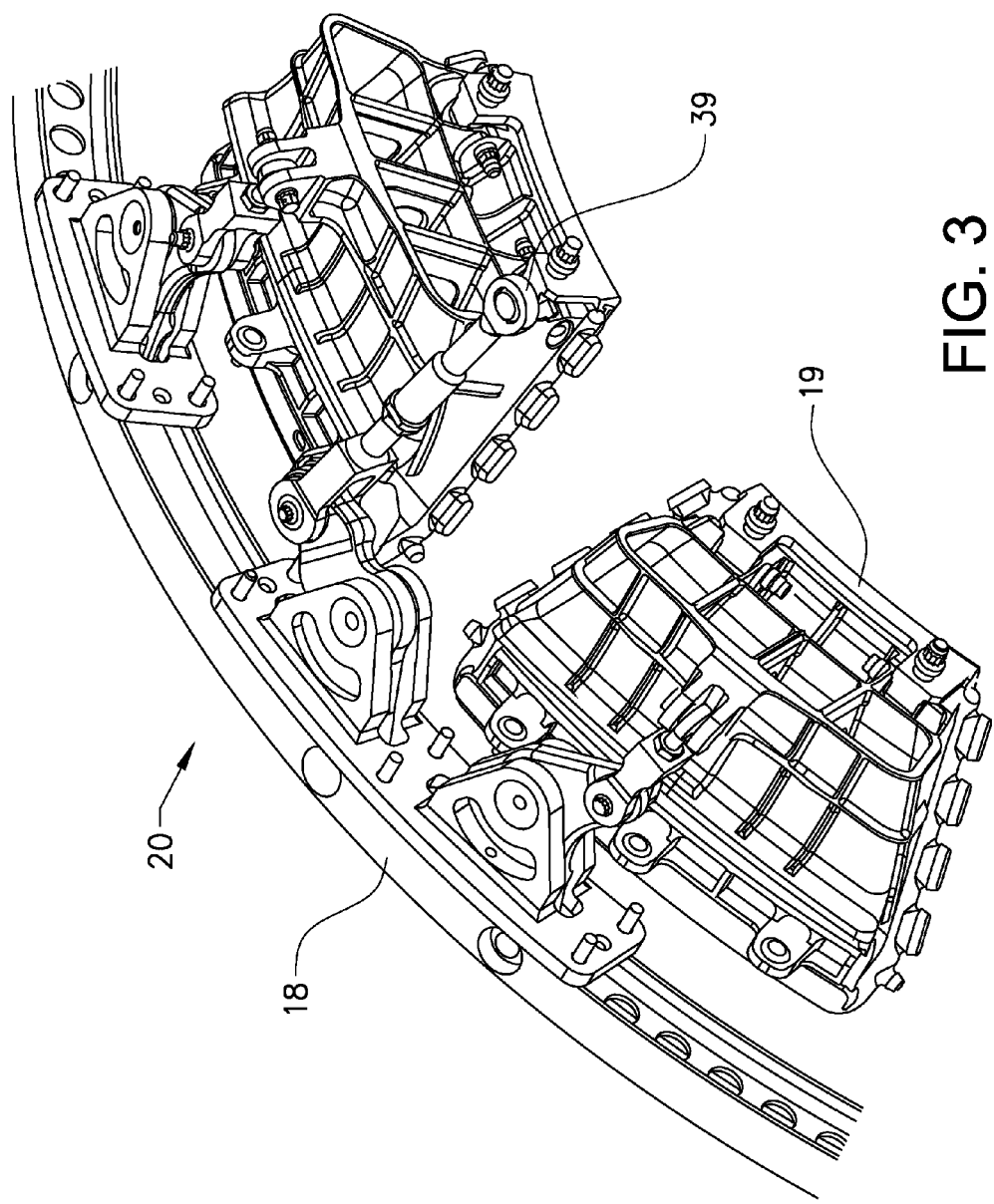
FIG. 3 is an enlarged perspective view of the arrangement of the actuator of the apparatus in FIG. 2.

A device 20 is arranged for moving each moveable element 19 between a first and a second position when the annular member 18 is pivoted in its circumferential direction. Two actuators 39 are connected to the annular member 18 for pivoting the member between a first and second position in its circumferential direction, which correspond to the first and second inclined position of the moveable elements 19. FIG. 3 shows an enlarged view of the arrangement of the actuator 39.

Figure 4:
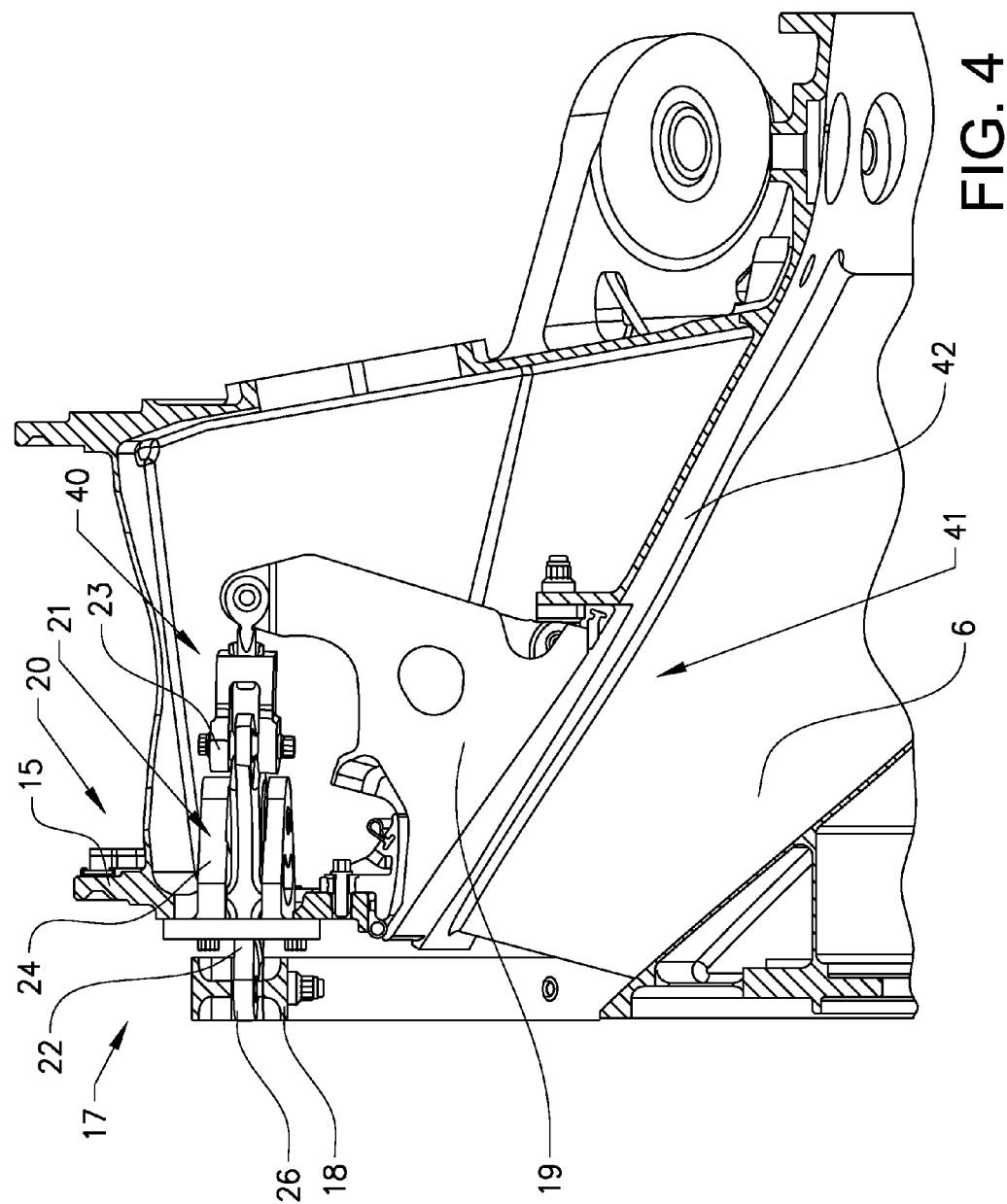
FIG. 4 is an exposed side view of the apparatus of FIG. 2.

FIG. 4 shows a cut side view of the apparatus 17 arranged in the aircraft engine 1. Here, the closing element 19 is arranged in a position where the bleed passage 41 through a wall 42 of the primary gas duct 6 is closed. The load carrying engine structure 15 forms a casing wherein the closing element 19 is arranged on an inner side of its wall and the annular member 18 is arranged on an outer side of its wall.

The device 20 comprises a linkage 21 extending through an opening in the wall of the load carrying engine structure 15. The linkage 21 connects the pivotably arranged annular member 18 with the closing element 19. More specifically, the linkage 21 comprises a link member 22 which extends through the opening in the wall of the load carrying engine structure 15. The link member 22 is formed by a crank according to one embodiment and will below be referred to as a crank. The crank 22 is connected to the moveable element 19 via a first articulation joint 23. More specifically, the crank 22 is connected to the moveable element 19 via a link mechanism 40. The crank 22 extends between the first articulation joint 23 and a second articulation joint 26, which is directly connected to the annular member 18. The device 20 further comprises a support member 24 and means 25 for releasably securing the support member 24 to the stationary casing, see FIG. 5. The support member 24 is formed by a bracket according to one embodiment and will below be referred to as a bracket. The bracket 24 is rigidly connected to the wall of the load carrying engine structure 15 via bolts 25, see FIG. 5. Thus, the bracket 24 is detachably connected to the engine structure 15.

Figure 5:
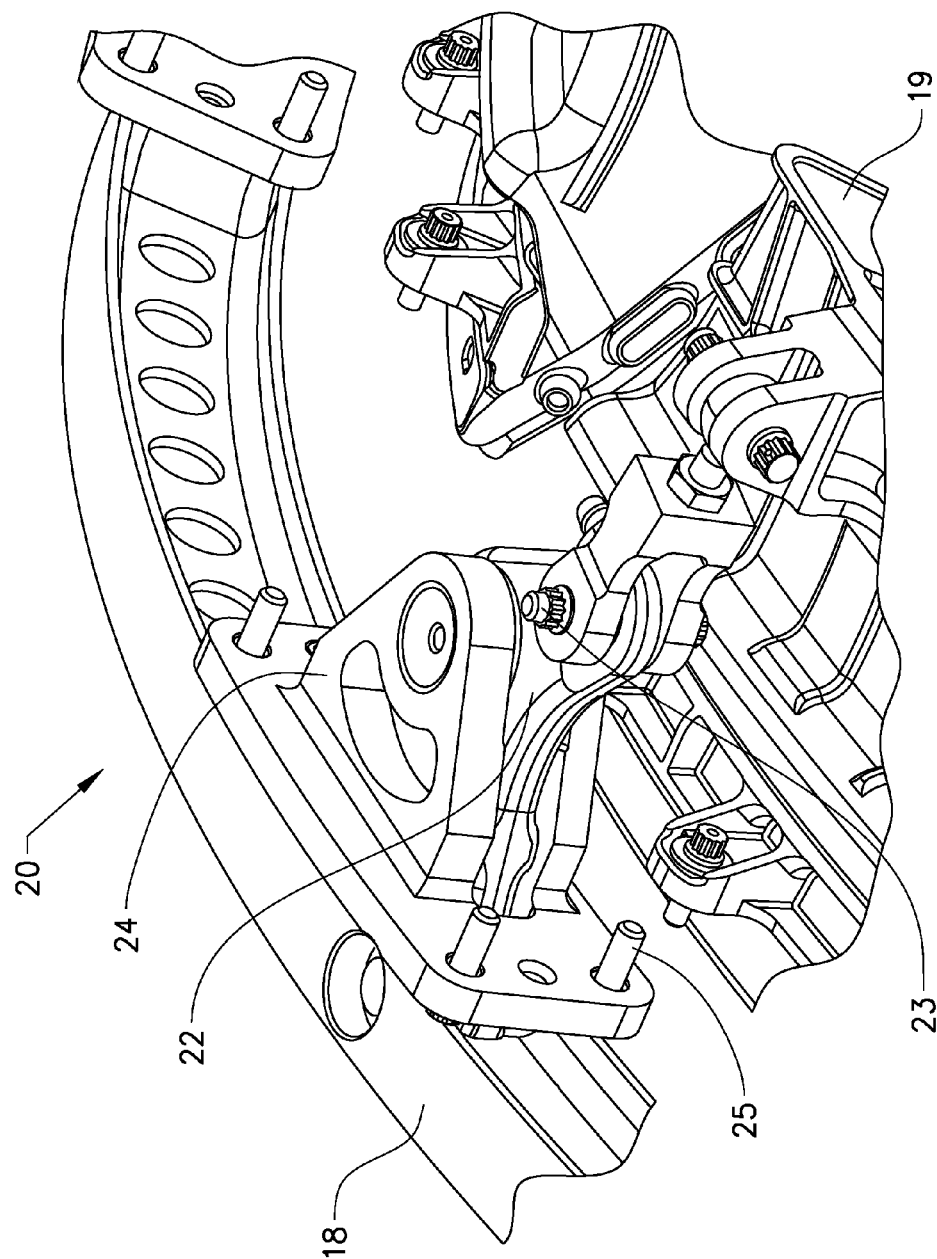
FIG. 5 is an enlarged perspective view of a device for transmitting a motion from an annular member to the moveable element.
Figure 6:
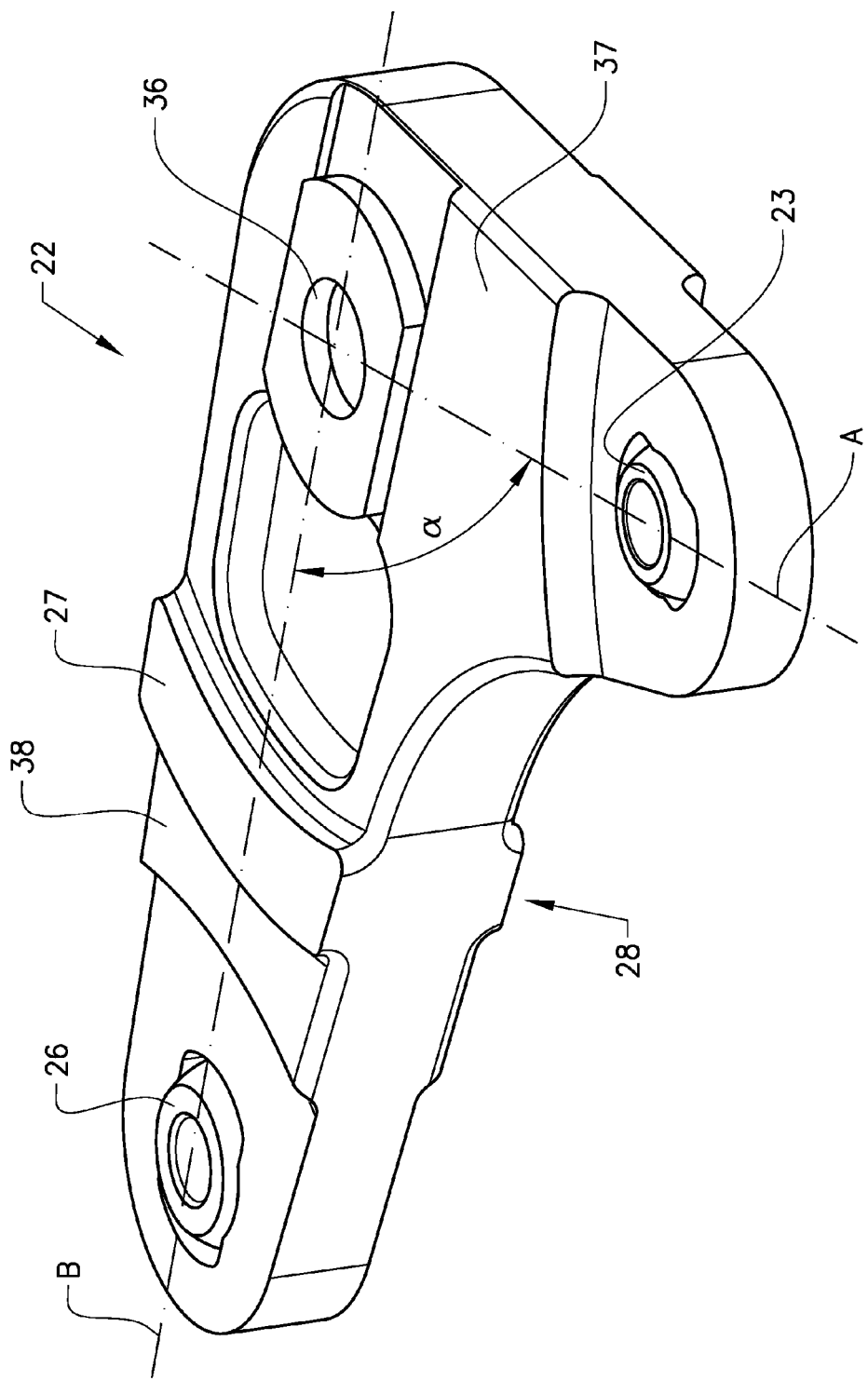
FIG. 6 is an enlarged perspective view showing a link member of the device of FIG. 5.
Figure 7:
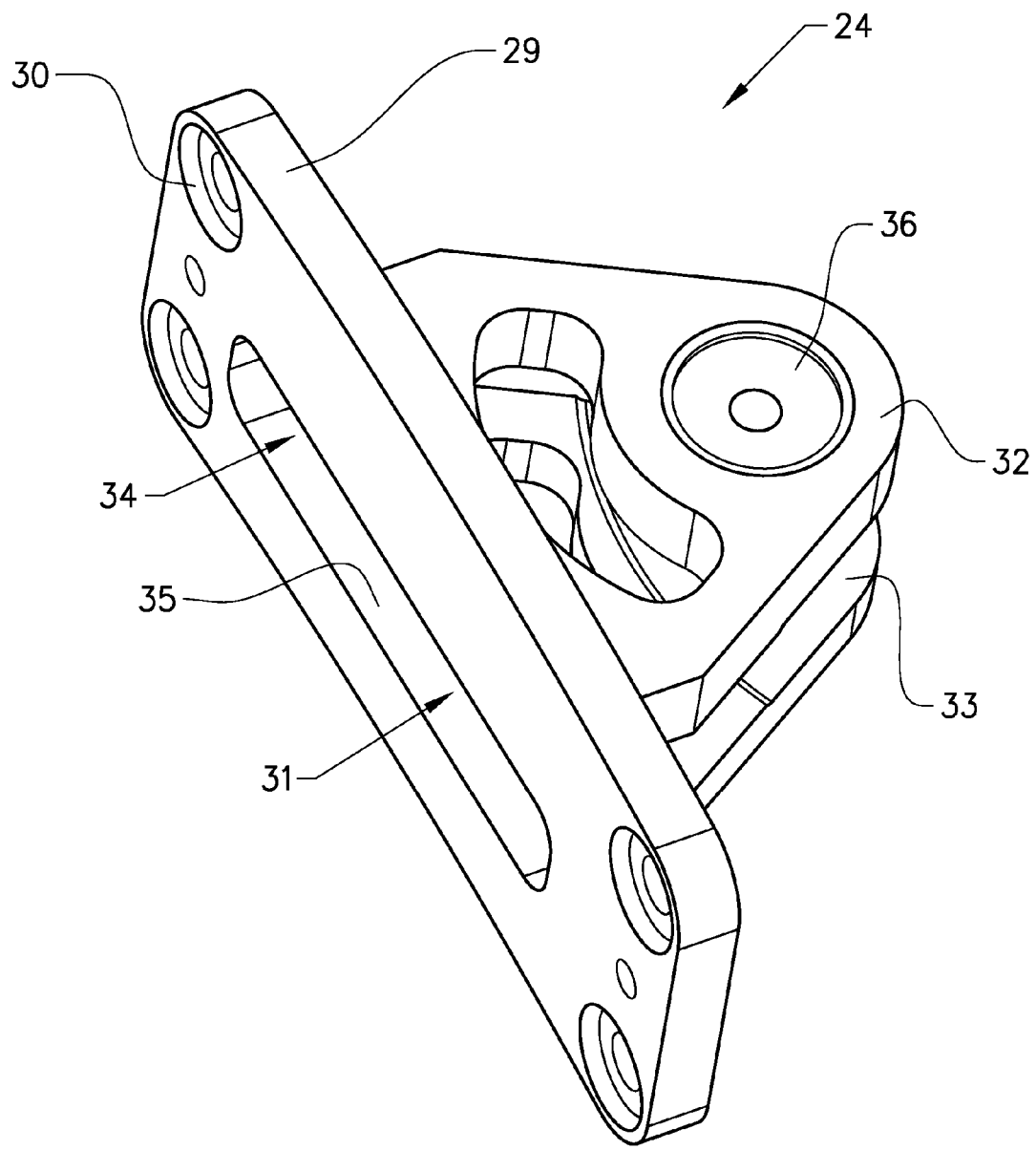
FIG. 7 is an enlarged perspective view showing a support member of the device of FIG. 5.

FIG. 5 shows the device 20 in more detail in a perspective view. The bracket 24 supports the crank 22 at a distance from the first articulation joint 23. More specifically, the crank 22 is glidingly supported by a support surface of the bracket 24. Referring now also to FIGS. 6 and 7 which show the crank 22 and the bracket 24, respectively, in perspective views.

The crank 22 has a generally flat shape. The crank 22 comprises an upper portion 27 for glidingly contacting an adjacent surface of the bracket 24. The crank 22 also comprises a lower portion 28 for glidingly contacting an adjacent surface of the bracket 24. The surface of each of the upper and lower portions 27,28 is designed to have a low friction coefficient. The upper and lower portion 27, 28, respectively is formed by a projecting part with a flat outer surface. Each of the projecting parts 27,28 forms an elongated portion, or ridge, extending across the crank 22. Thus, the elongated portions 27,28 extend transverse with regard to a lengthwise direction of the crank 22.

The bracket 24 comprises two opposed support surfaces 34,35 for receiving and glidingly supporting the crank 22 therebetween. The contacting support surfaces 27,34 and 28,35, respectively are positioned between the first articulation joint 23 and the second articulation joint 26. Further, the bracket 24 comprises a plate-shaped base 29 with holes 30 for said bolts 25. The plate-shaped base 29 comprises an elongated through-hole 31 for receiving the crank 22. Further, two substantially flat, parallel parts 32,33 project at right angles from the plate-shaped base on opposite sides of the hole 31.

The opposed support surfaces 34,35 for glidingly supporting the crank 22 are arranged one on each of the projecting parts 32,33.

Figure 8:
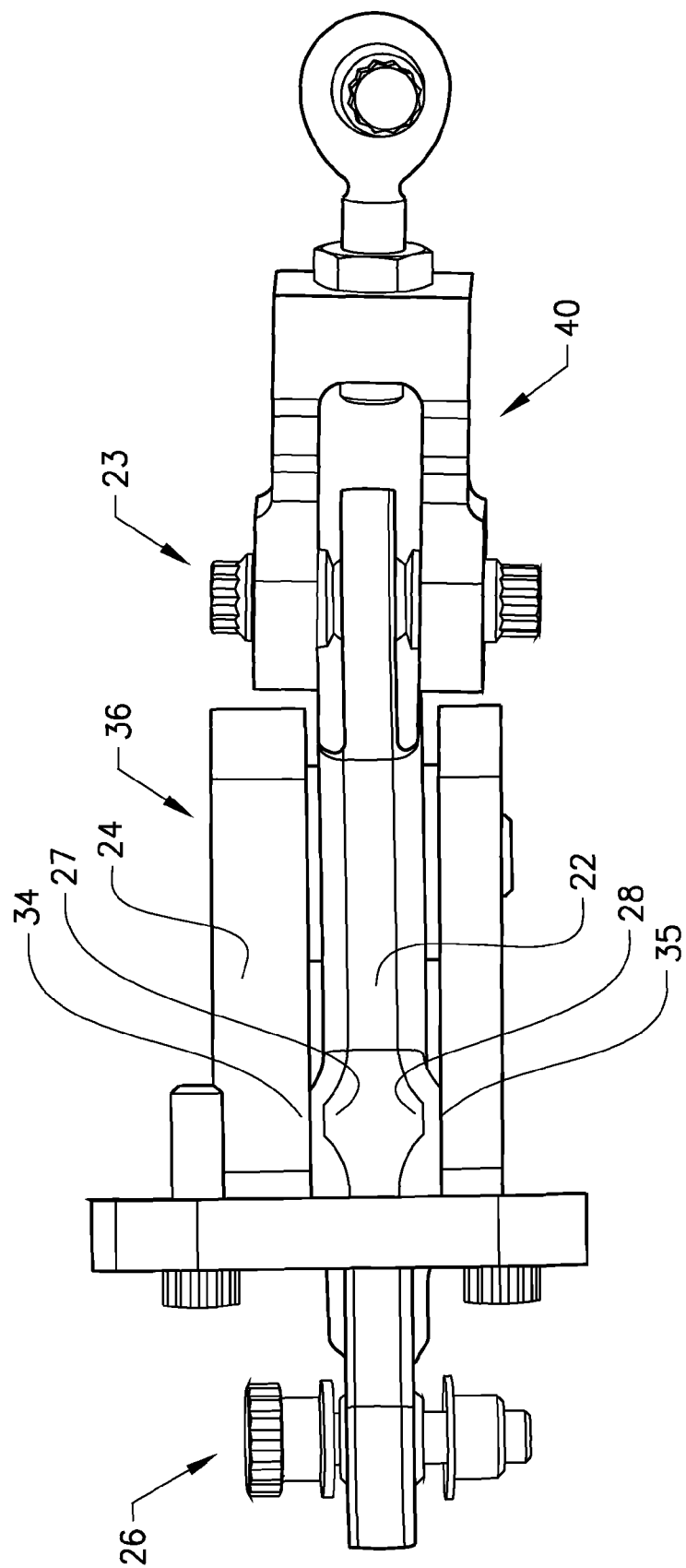
FIG. 8 is a perspective view showing a side view of the link member and support member in an operational state.

FIG. 8 shows a side view of the bracket 24 and the crank 22 in an operational state. The flat crank 22 is arranged in parallel with the flat parts 32,33. Each of the two opposed support surfaces 34,35 of the bracket is in contact with one of the flat surfaces of the projecting portions 27,28 of the crank. By virtue of this design, axial loads are transmitted via the support surfaces 34,35.

The crank 22 is connected to the bracket 24 via a third articulation joint 36 positioned between the first articulation joint 23 and the second articulation joint 26 in the extension direction of the crank 22. The third articulation joint 36 forms a fulcrum point, wherein the crank 22 is pivoted around the fulcrum point. The upper and lower support surfaces 27,28 are located at a distance from the fulcrum point 36. This reduces bending loads on the crank support pin and provides a stable support for the crank 22. The contacting portions 27,28 of the crank 22 are arranged at a distance from the fulcrum point 36 and between the second articulation point 26 and the fulcrum point 36, preferably about half way between the second articulation point 26 and the fulcrum point 36.

More specifically, the crank 22 extends in such a way between the first, second and third articulation joints 23,26,36 that pivoting of the annular member 18 causes the first articulation joint 23 to move a distance in a direction in parallel with a pivot axis of the annular member 18, see FIG. 5.

More specifically, the first, second and third articulation joints 23,26,36 are arranged in such a way that a straight line "A" running through the first articulation joint 23 and the third articulation joint 36 crosses a straight line "B" running through the second articulation 26 joint and the third articulation joint 36, see FIG. 6. In other words, the crank 22 comprises a first arm 37 extending between the first articulation joint 23 and the third articulation joint 36 and a second arm 38 extending between the second articulation joint 26 and the third articulation joint 36. The arms 37,38 are inclined relative to one another with an angle α, which is somewhat larger than 90°, preferably between 90° and 120°. The crank 22, comprising the arms 37,38, is of a one-piece construction.

The annular member 18 is suspended relative to the casing 15 via the plurality of linkages 21 spaced in the circumferential direction of the annular member 18. This is accomplished in that the cranks 22 are supported by the brackets 24 in the above described manner. Thus, no further suspension of the annular member is required.

The invention is not in anyway limited to the above described embodiments, instead a number of alternatives and modifications are possible without departing from the scope of the following claims.

According to an alternative, the bleed apparatus is arranged downstream of the combustor 12 for routing air from the primary gas duct 6 to the secondary gas duct 7. More specifically, it may be arranged between the high pressure turbine 13 and the low pressure turbine 14.

According to a further alternative, the bleed apparatus is not limited to be arranged through an outer wall of an inner gas duct, like the primary gas duct 6, but may also be arranged in a radially inner wall of an outer gas duct, like the fan duct 7. The annular member would then, of course be arranged inside the outer gas duct.

The invention may further be utilized in other gas turbine applications, for example, engines for vehicles, power plants in vessels and in stationary applications, such as in power stations for electricity production.

The invention may further be utilized for other applications than bleeding gas from a gas duct. The moveable element is preferably arranged in order to effect a gas flow. For example, the device and apparatus may be utilized for inclination of stationary struts/vanes in a compressor and/or turbine section of a gas turbine.

What is claimed is:

1. An apparatus (17) for a gas turbine comprising:
   a pivotably arranged annular member (18);
   a plurality of moveable elements (19) spaced in a circumferential direction about the annular member (18) and a device (20) for moving each moveable element (19) between a first and a second position by pivoting the annular member (18), wherein said device (20) comprises a linkage (21) connecting the pivotably arranged annular member (18) with said moveable elements (19); and
   said linkage (21) comprises a link member (22) connected to the moveable element (19) via a first articulation joint (23) and the device (20) comprises a support member (24), which supports the link member at a distance from the first articulation joint (23).

2. The apparatus as recited in claim 1, wherein the link member (22) is slidingly supported by a support surface (34, 35) of the support member (24).

3. The apparatus as recited in claim 1, wherein the support member (24) comprises two substantially flat, parallel parts (32, 33) that define two opposed support surfaces (34, 35) for receiving and slidingly supporting the link member (22) therebetween.

4. The apparatus as recited in claim 3, wherein the flat parallel parts (32, 33) extend from the base portion (29) on opposite sides of the through-hole (31).

5. The apparatus as recited in claim 1, wherein the support member (24) comprises a base portion (29) with a through-hole (31) for receiving the link member (22).

6. The apparatus as recited in claim 1, wherein the device further comprises means (25) for releasably securing the support member (24) to a stationary casing (15).

7. The apparatus as recited in claim 1, wherein the link member (22) extends between the first articulation joint (23) and a second articulation joint (26) adapted to be connected to the annular member (18).

8. The apparatus as recited in claim 7, wherein a support surface (27, 28) of the link member (22) is positioned between the first articulation joint (23) and the second articulation joint (26).

9. The apparatus as recited in claim 7, wherein the link member (22) is connected to the support member (24) by a third articulation joint (36) positioned between the first articulation joint (23) and the second articulation joint (26).

10. The apparatus as recited in claim 9, wherein the third articulation joint (36) forms a fulcrum point.

11. The apparatus as recited in claim 9, wherein the link member (22) extends between the first, second, and third articulation joints (23, 26, 36), such that pivoting of the annular member (18) causes the first articulation joint (23) to move a distance in a direction in parallel with a pivot axis of the annular member (18).

12. The apparatus as recited in claim 9, wherein the link member (22) comprises at least one projecting portion (27, 28) adapted for glidingly contacting a support surface (34, 35) of the support member (24) and that the projecting portion (27, 28) is located at a distance from the third articulation joint (36).

13. The apparatus as recited in claim 1, wherein the moveable element (19) is adapted to be arranged in different inclined positions in the first and second position.

14. The apparatus as recited in claim 1, wherein the moveable element (19) is pivoted around an axis between the first and second position.

15. The apparatus as recited in claim 1, wherein the moveable element (19) is adapted for opening and closing an opening in a wall defining a gas duct (6) in a gas turbine for bleeding gas.

16. The apparatus as recited in claim 1, further comprising a casing (15) and said annular member (18) being suspended from the casing (15) by the plurality of linkages spaced about the circumferential direction of the annular member.

17. The apparatus as recited in claim 1, further comprising a casing (15) and said support member (24) being rigidly secured to the casing.

18. The apparatus as recited in claim 1, further comprising an actuator (39) connected to the annular member (18) for pivoting the member between a first and second position in its circumferential direction, which correspond to the first and second position of the moveable element (19).

19. The apparatus as recited in claim 1, wherein said apparatus (17) is incorporated into a gas turbine engine.

20. The apparatus as recited in claim 1, wherein said apparatus (17) is incorporated into an aircraft engine.

21. An apparatus for a gas turbine comprising:
a pivotably arranged annular member (18);
a plurality of moveable elements (19) spaced in a circumferential direction of the annular member (18); and
a device (20) for moving each moveable element (19) between a first and a second position by pivoting the annular member (18), wherein the device comprises a linkage (21) connecting the pivotably arranged annular member with said moveable elements (19); and
said annular member (18) is suspended from a casing (15) via the plurality of linkages spaced in the circumferential direction of the annular member.

22. The apparatus as recited in claim 21, wherein the linkage (21) comprises a link member (22) connected to the moveable element (19) via a first articulation joint (23) and the device comprises a support member (24) supporting the link member at a distance from the first articulation joint.

* * * * *